United States Patent [19]
Alix et al.

[11] Patent Number: 5,278,937
[45] Date of Patent: Jan. 11, 1994

[54] HUMIDIFIER ESPECIALLY SUITABLE FOR AIRCRAFT AIR CONDITIONING SYSTEM

[75] Inventors: Guy-Paul Alix; Marc Kohler, both of Brest; Jean-Michel Tranvoez, Bouffemont, all of France; Jean-Marc Manchec, Simi Valley, Calif.

[73] Assignee: Industrielle Du Ponant SA, France

[21] Appl. No.: 686,607

[22] Filed: Apr. 17, 1991

[30] Foreign Application Priority Data

Apr. 18, 1990 [FR] France ................. 90 05100

[51] Int. Cl.$^5$ .......... H05B 1/02; F24F 3/14; B01F 3/04; F22B 1/28
[52] U.S. Cl. .................. 392/402; 261/142; 261/DIG. 48; 392/325
[58] Field of Search .......... 392/394, 324–330, 400–402, 399; 261/141, 142, DIG. 48

[56] References Cited

U.S. PATENT DOCUMENTS

| | | | |
|---|---|---|---|
| 1,646,746 | 10/1927 | Carroll | 392/401 |
| 1,695,803 | 12/1928 | Eimer | 392/401 |
| 3,523,175 | 8/1970 | Gygax | 392/402 |
| 3,660,635 | 5/1972 | Liebert | 392/401 X |
| 4,139,762 | 2/1979 | Pohrer et al. | 392/402 |
| 4,262,191 | 4/1981 | Lepper et al. | 392/327 X |
| 4,287,407 | 9/1981 | Treiber et al. | 392/400 |
| 4,605,838 | 8/1986 | Daney | 219/523 X |
| 4,668,854 | 5/1987 | Swan | 392/402 X |
| 5,037,585 | 8/1991 | Alix et al. | 261/142 |

FOREIGN PATENT DOCUMENTS

| | | | |
|---|---|---|---|
| 345190 | 12/1989 | European Pat. Off. | 392/402 |
| 1553880 | 10/1979 | United Kingdom | 392/402 |

Primary Examiner—Anthony Bartis
Attorney, Agent, or Firm—Laff, Whitesel, Conte & Saret

[57] ABSTRACT

A steam generator for the humidifier of an air conditioning system, especially an aircraft air conditioner system, is connected by a duct to a dilution cone located inside an air flow duct (4) of the humidifier. A container (21) has an opening (22) for enabling an exiting of the steam developed inside said container (21). The opening (22) is connected to the humidifier duct (4). An opening (23) for the filling with water, is connected to the outlet of a feed valve (48), the intake opening of which may be connected to a source for the supply of water. Inside the container (21), an electric resistor (30) is completely immersed in the water. A regulating unit (60) receives signals delivered by a hygrometer (9) and that governs the intensity of current passing through the resistor (30). The regulating unit (60) causing the intensity of the current in resistance (30) to be dependent on the value of the signals delivered by the hygrometer (9). The regulating unit ascertains, through a non-use indicator fuse, whether or not the container is new or previously used and prohibits start of operation should a used container be installed.

4 Claims, 3 Drawing Sheets

HUMIDIFIER ESPECIALLY SUITABLE FOR AIRCRAFT AIR CONDITIONING SYSTEM

The present invention relates to a steam generator that is used in a humidifier for an air conditioning system and, more especially, for an air-craft air-conditioning system.

Humidifiers for air-conditioning systems for air-craft are known and it will be possible to refer, for the sake of example, to the French Patent Application No. 89 02063.

In that application, there is described a humidifier for air-conditioning system that comprises an air flow duct for the circulation of warm air to be humidified, a water vapor (steam) generator the outlet of which is located at the summit of a divergent cone that extends as far as the internal wall of the air flow duct, the lateral surface of the cone being equipped with perforations to let the warm air pass and to mix it, in a homogeneous manner with the steam developed by the steam generator.

There are well known the advantages offered by the use of a steam generator in a humidifier and there will be mentioned, among them the fact that it is possible to use water containing mineral elements and, especially, the water from the plane circuit. Let us also mention the fact that it operates without the development of condensation in the air flow duct that leads the air to the airplane cabin.

One purpose of the invention is to provide a steam generator usable in such a humidifier and in which the exhaust steam quantity is perfectly regulatable, especially as a function of the moisture need in the airplane.

To that end, a steam generator of a humidifier in an air-conditioning system is connected, by a duct, to the a dilution cone located inside an air circulation air flow duct of the humidifier. A container is equipped with an outlet for the exit of the steam developed inside said container. The opening at the outlet is connected to the duct of the humidifier, with an opening for the filling with water, connected to the outlet of a water feeding valve. The inlet of the valve is connected to a water feeding source. Inside the container, an electric resistance heating element is completely immersed in the water in the container up to a given height. A regulating unit that receives the signals delivered by a hygrometer that governs the intensity of the current through the resistance heating element. The unit adjusts the intensity of the current in the resistance heating element according to the value of the signals delivered by the hygrometer. The regulating unit further governing the opening of the feed valve when the water level in the container, as measured by a level detector, is below a lower threshold level and governs the closing of the valve when the water level in the container has exceeded an upper threshold level.

Thus, by means of the level detector, the water volume in the container is maintained approximately constant. Consequently, the quantity of steam developed by the generator is directly proportional to the intensity of the electric current in the electric heating element resistance. Thus, by regulating the current intensity as a function of the signals delivered by an hygrometer in the cockpit of the airplane, there is a regulated quantity of steam generated by the generator as a function of the level of the humidity in the cockpit.

According to another characteristic of the present invention, the container is movably mounted on a support that in addition carries the regulating unit and the feed valve. The regulating unit also governs the feeding valve to fill the container when the latter has just been installed on the support or set into operation.

Thus, a steam generator according to the present invention is not faced with the problem of scale deposit that, with time, could close the pipes and ducts of the humidifier since, after a given period of time, the container equipped with its resistance heating element and with its level detector, is replaced with a new one.

According to another characteristic of the invention, the level detector is constituted, inside the container, by two vertical electrodes that receive current from the regulating unit at a constant voltage. The regulating unit measures the current that runs through the electrodes to deduce therefrom the water level in the container. The container is further equipped with a discharge opening connected to the intake of an electrically governed discharge valve. The intake of that valve is performed by the regulating unit to perform, at times that are set by the regulating unit itself, the evacuation of a certain quantity of water contained in the container. That evacuation operation is by an order for the opening of the feed valve until the time when the water level in the container is beyond the level of the higher threshold.

When the water evaporates, not only does the level in the container go down, but the concentration of mineral elements increases. The conductivity of the water is modified and the electrodes supply a current the intensity of which for a given water level, the regulated water level, has decreased. By evacuating a certain part of that water, and by filling with water having a lower mineral concentration, that concentration is made to decrease to a value that remedies that drawback and that permits, then, a good operation of the level detector.

According to another characteristic of the invention, the support carries the discharge valve and the regulating unit governs its opening to empty the container at the time same is changed.

According to another characteristic of the present invention, the electric resistance heating element is constituted by a metallic wire wound as a spiral on a truncated cone the axis of which is approximately parallel to the longitudinal axis of the container and the smaller base of which is turned toward the bottom of the container.

That particular form of the resistance heating element causes the lime that is deposited on the resistance to have a tendency to release itself and to fall to the bottom of the container. That effect may be increased if the water boils between the spiral turns of the resistance heating element. The resistance not becoming coated, it offers a heat transfer approximately constant over time.

According to another characteristic of the present invention, the steam generator is equipped with a support which is movable in translation along the main axis of the container along the main axis, a tubular support part is connected to the duct of the humidifier. That part comes to be hooked, in a movable manner, on the steam exit opening of the container. Contact terminal blocks that receive contact terminal blocks of the container, to which the electrodes of the container are connected.

Thus, by moving away from the container, the support disconnects the contact terminal blocks of the container and disconnects the opening of the container, it being then possible to remove the latter.

According to another characteristic of the present invention, the container is equipped with an electrode connected to the regulating unit, and that is connected, inside the container, to a first terminal of a non-use indicator fuse the other terminal of which is connected to one of the resistance heating element terminals, the regulating unit ascertaining, at the time a new container is installed, whether the non-use indicator fuse is electrically conductive or not, the regulating unit in the first case sending into the fuse a current intense enough to cause it to melt and, in the second case, forbidding the start of operation of the generator.

Thus it is impossible to install a container that has already been used.

According to another characteristic of the invention, the regulating unit receives the signals of a temperature probe and of a humidity probe mounted in the air circulation air flow duct of the humidifier and, when those signals exceed pre-set values, it orders the cut-off of the electrode current and the opening of the discharge valve.

According to another characteristic of the invention, the regulating unit receives the signals of a temperature probe located close to the container and, when these signals exceed a pre-set value, it orders the cut-off of the electrode current and the opening of the discharge valve.

These means constitute safety means that stop the generator when a malfunctioning is detected.

The above-mentioned characteristics of the invention, as well as others, will appear more clearly upon reading of the following description of one example of execution, that description being given with reference to the attached drawing in which.

Figure 1:
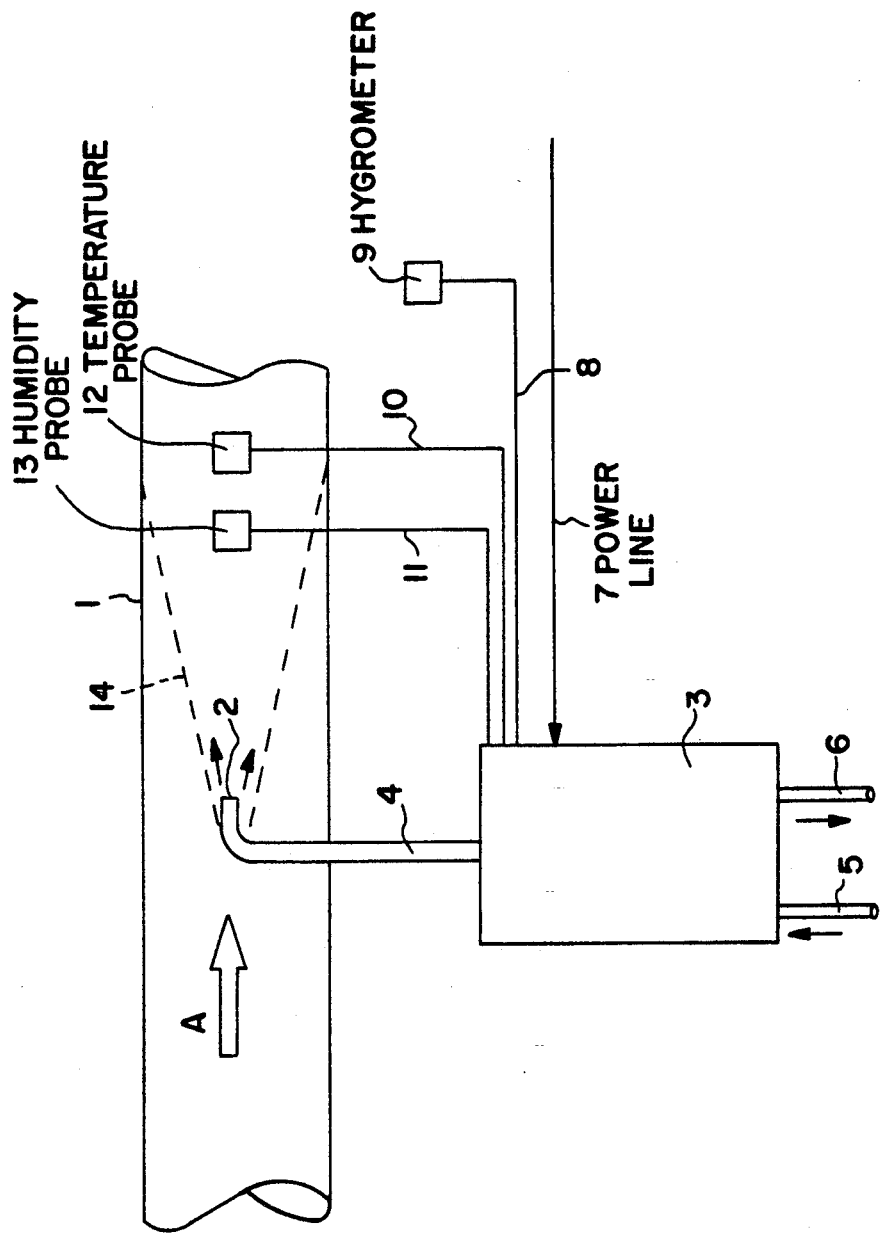
FIG. 1 shows the diagram of principle of an air humidifier that makes use of a steam generator according to the invention.

FIG. 1 shows an air-circulation air flow duct of an air-plane that air, that has first been warmed having to be humdified. In the cylindrical air flow duct 1 there is installed in the axis of the air flow duct, the opening 2 of a steam generator 3, the fixation means of the outlet 2 not being shown. The outlet opening 2 is connected to the steam generator 3 by a duct 4 that runs through the wall of air flow duct 1.

The steam generator 3 receives, through a duct 5, water from the source (not shown) of the plane while, through duct 6, it is connected to an overflow pipe (not shown). It is connected, by a multiwire line 7, to a source of electric current (not shown). It is also connected, by a wire 8, to a humidity detector hygrometer 9 mounted, for example, in the cockpit of the airplane, by means of wires 10, 11, respectively to a temperature probe 12 and to a humidity probe 13.

Around the outlet opening 2, there is mounted the small base of a dilution cone 14 the axis of which is the same as the longitudinal axis of the air flow duct 1, and the large base of which is made as of one piece with the internal surface of air flow duct 1, downstream from outlet opening 2. The lateral wall of cone 14 is pierced with holes through which there passes the warm air that thus enters cone 14 (arrow A), the air-flow regime downstream from cone 14 being turbulent to ensure a homogeneous mixing of the air with the steam sent out by outlet opening 2.

Figure 2:
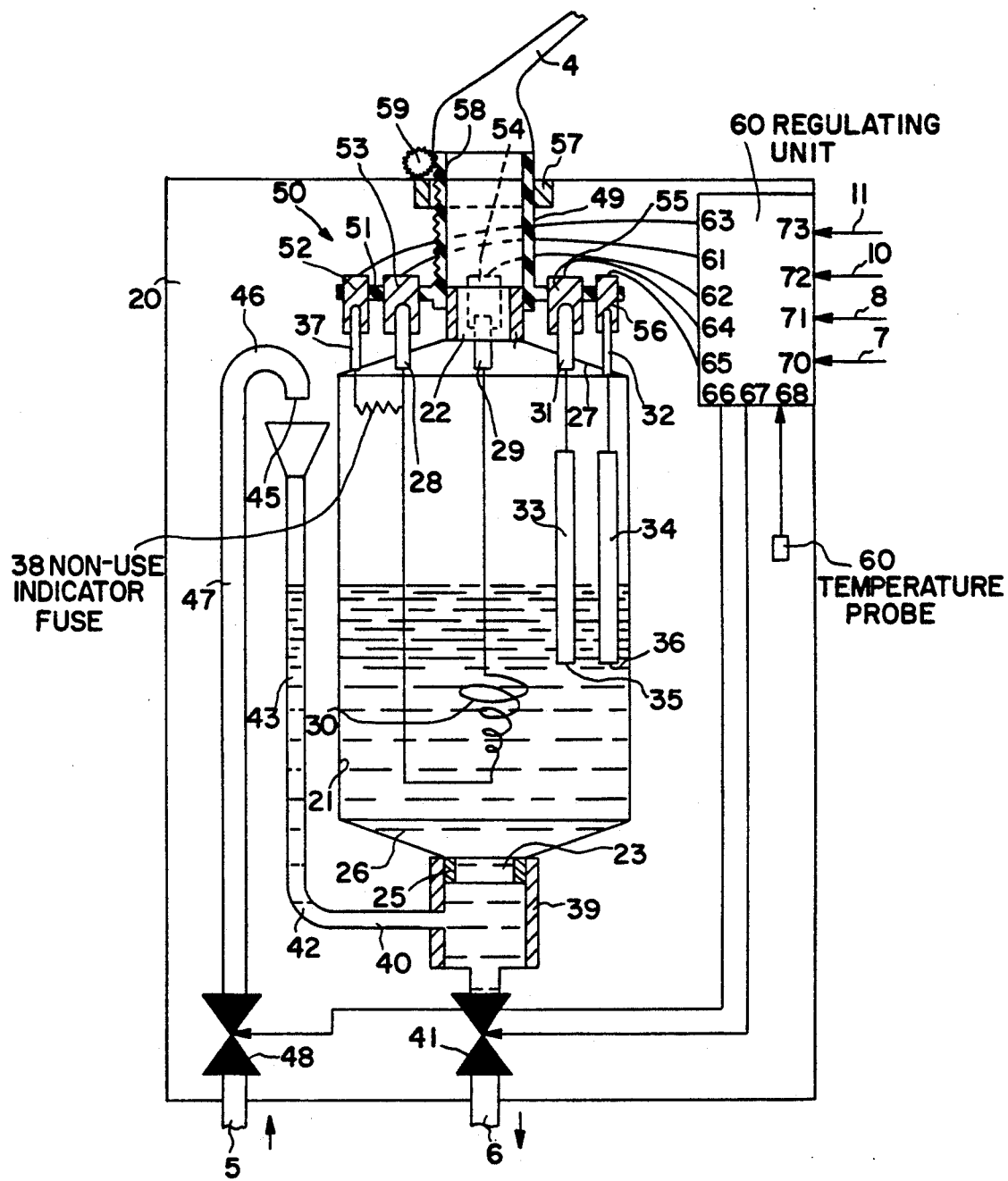
FIG. 2 shows a section view of a steam generator according to the invention, that generator being ready to operate.

The steam generator 3 shown in detail in FIG. 2 comprises a support 20 on which there is mounted a container 21 essentially cylindrical in shape, the two bases of which are in the shape of a truncated cone.

At the high and low ends of container 21, which ends are identical, are two openings 22 and 23 at axial ducts 24, 25. The upper and lower ducts 24, 25 respectively project from bottom 26 and upper wall 27 toward the outside of container 21. On its upper wall 27, container 21 is equipped with two connecting blocks 28, 29 to which are respectively connected, inside container 21, a first terminal and a second terminal of an electric resistance heating element 30 located in the lower part of container 21. The latter is made up of a electrically resistive metallic wire wound in spiral along an axis parallel to the longitudinal axis of container 21. Advantageously, for reasons already indicated above, electrically resistive wire is wound over the external surface of a truncated cone that has its small base turned toward the bottom 26 of the container. There is shown in fine dash lines, the water contained in container 21. It can be observed that resistance 30 is completely immersed in that water. A third and a fourth connecting block 31, 32, also provided on the upper wall 27, are respectively connected to a first and to a second metallic electrodes, 33 and 34, parallel to the longitudinal axis of container 21, and the lower edges 35, 36 of which always remain below the level of the upper threshold of the water contained in the container. Electrodes 33, 34 have surfaces that face each other. A fifth connector block 37 is provided on the upper wall 27 of container 21 and it is connected, inside that container, to a first terminal of a non-use indicator fuse 38 the other terminal of which is connected to one of the connecting blocks 28, 29 connected to resistance 30.

The lower duct 25 is fitted on a first end of a tube 39 that laterally receives a duct 40, the other end of duct 39 being connected to the intake opening of a discharge valve 41 electrically governed. The output opening of valve 41 is connected to piping 6 already shown in FIG. 1. It is mounted as of one part with a support 20. Duct 40 forms an elbow 42 and it has a linear part 43 approximately parallel to the longitudinal axis of container 21. At the end of the linear, part 43, there is provided an outwardly flared end 44 toward the end 45 of a second duct that has an elbowed part 46 and a part 47 for connecting with the output opening of an electrically governed filling valve 48. Valve 48 has its input opening connected to the piping 5 already shown in FIG. 1. The free end 45 of duct 46, 47 advantageously is equipped with a small opening so that the water escaping from it falls drop by drop into the flared part 43 of duct 40. That arrangement is provided in order to electrically insulate the water contained in container 21 from the electric potential at valve 48.

The upper duct 24 of container 21 is fitted into a tubular section 58 of a support 50. The latter is formed of a plate 51 coming as of one piece with the tubular part 49 and on which there are provided five female electrical connecting terminal blocks 52 to 56, that respectively come to fit on connecting block 37, on the two male connecting blocks 28, 29 connected to the terminals of resistance heating element 30, and on the two male connecting blocks 31, 32 connected to electrodes 33, 34. The tubular part 49 is provided so as to axially slide inside a socket 57 solidary of support 20. On one of its generatrices, the tubular part 49 is equipped with a rack 58 that engages with a toothed wheel 59 the axis of which is mounted rotatory on support 20. The tubular part 49 receives, in its upper part, duct 4 already shown in FIG. 1 and that connects the steam generator 3 to the humidifier.

On support 20 there is also mounted a regulating unit 60 having two outputs 61, 62, respectively connected to the two female connecting blocks 53, 54 (themselves connected to the terminals of resistance heating element 30), one input/output 63 connected to connecting block 52, two outputs 64, 65 to which are connected the third and fourth connecting blocks 55, 56, two outputs 66, 67 respectively connected to the valve governing inputs 48, 41, an input 68 connected to a temperature probe 69 mounted on support 20, a multi-wire input 70 that receives, through the multi-wire line 7 already shown in FIG. 1, the feed voltages necessary to the good operation of the generator, and three inputs 71, 72, 73 respectively connected to wires 8, 10, 11 already shown in FIG. 1. Let us recall that these wires 8, 10, 11 respectively are connected to a hygrometer 9 advantageously mounted in the cockpit of the airplane, to a temperature probe 12 and to a humidity probe 13 both of them mounted inside air flow duct 1.

The regulating unit (60) governs the feed valve (48) to fill the container (21) when it has just been installed on support (20) or when it is set into operation. The new container cannot be set into operation unless a proper fuse is in place and intact. The regulating unit (60) verifies, at the time of installation of a new container (21) whether fuse (38) is conductive or not. If it is conductive, regulating unit 60 sends a current intense enough to cause the fuse to melt. If it is not conductive the regulator unit forbids an application of a current to the resistance heating element 30. This feature insures that after stopped condition, a new container with a good fuse must be used.

Figure 3:
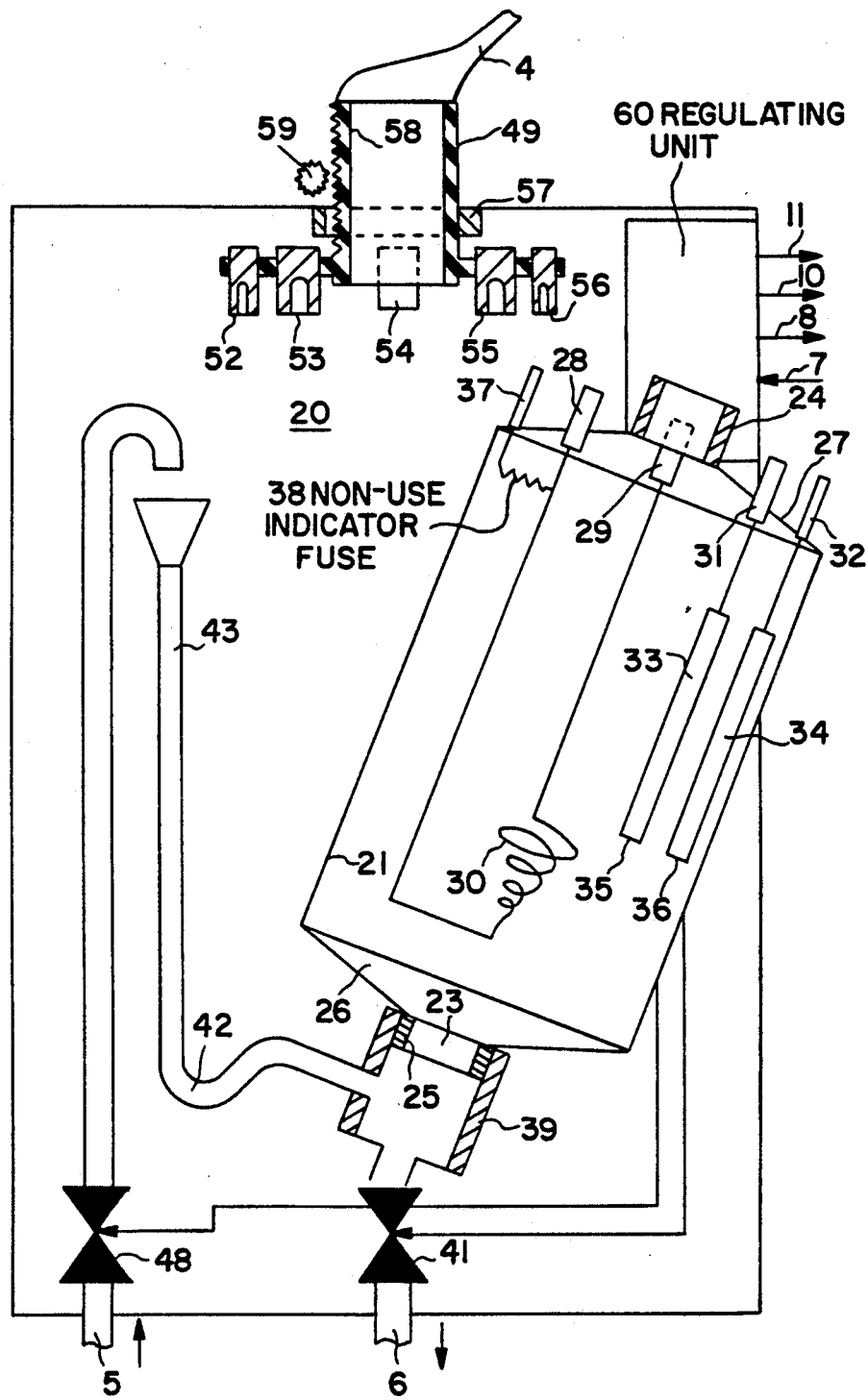
FIG. 3 is a section view of a steam generator according to the present invention, the container of the generator being shown tilted and ready to be removed.

When toothed wheel 59 is made to rotate, same drives support 20 upward, by means of rack 58. The female connecting blocks 52 to 56 become separated from the male blocks 28, 29, 31, 32, 37 of container 21, and its tubular part 49 becomes disengaged from the upper duct 24 of container 21. As shown in FIG. 3, the tubular part 39 can tilt over a certain angle around an axis perpendicular to the plane of support 20, and it can drive container 21 along, in that tilted position. The latter then can be taken out if its lower duct 25 is separated from tubular part 39.

It will be noted that, in FIG. 3, the connections of the connecting blocks 52 to 56 to the regulating unit 60 are not shown, not to complicate the drawing.

The regulating unit 60 advantageously is governed by a microprocessor, so that the operation of the steam generator according to the invention is bound to the governing programs of that microprocessor.

In this way, the regulating unit 60 receives signals from the two temperatures probes 12, 69, from a humidity probe 13 and from a hygrometer 9 and it governs, as a function of the received signals and of their treatment by the microprocessor, the intensity in the electric resistance heating element 30, and the valves 41, 48.

The principle of operation is as follows: the electric resistance heating element 30 is fed a constant voltage, and it is the current running through it that is governed and regulated by the regulating unit 60. It is completely immersed inside the water contained in container 21 and it transmits the quantity of heat it generates by Joule's effect, to that water. When heating is sufficient, the quantity of water that evaporates is directly proportional to the quantity of heat transmitted, and therefore to the intensity of the current circulating through the resistance. The steam generated is taken out of the container 21 by duct 4 and it reaches the small base of cone 14 inside air flow duct 1 to become mixed with the air circulating in it and to moisten same.

The regulating unit 60 receives, on its input 71, the signals developed by the hygrometer 9 and, on the basis of given orders, it deduces from them the moisture needs in the cockpit of the airplane. If the humidity level in the cockpit is below the ordered level, the regulating unit 60 governs, by its outputs 61, 62, an increase in intensity of the current passing through resistance heating element 30, that increase being, for example, proportional to the difference between these levels. Likewise, if the level in the cockpit is higher than the ordered level, it governs a decrease in intensity of the current passing through resistance heating element 30, for example that will be proportional to the difference between the values of these levels. The man of the art will have understood that the intensity of the current passing through resistance heating element 30 is dependent on the value of the signals delivered by hygrometer 9.

By evaporating the level of the water in container 21 will decrease. The regulating unit 60 creates a potential difference between the electrodes 33, 34 that plunge into the water of container 21, and it measures the intensity of the current running through them. The latter is proportional to the area of the surfaces of the electrodes facing each other inside the water. When the water level in container 21 goes down, the current intensity decreases proportionally. The regulating unit 60 measures the intensity of that current and maintains it within a current range centered on a given current intensity value. If it goes down below the lower value of that range, the regulating unit 60 orders the opening of valve 48, this having as a result to raise the water level in container 21. The current intensity in electrodes 33, 34 increases up to a point where it exceeds the upper value of the range. At that point, the regulating unit 60 orders the closing of valve 48. The electrodes 33, 34 play the part of a water level detector, and unit 60 maintains, by its control of valve 48, an approximately constant water level, taking into account the hysteresis introduced by the very operation of the current regulation. In practice, the electrodes 33 and 34 make it possible to maintain the water level between a lower threshold level and an upper threshold level, the lower threshold always being above the resistance heating element 30.

In addition, when the water evaporates, the mineral element concentration of the water in the container increases, the conductivity of the water, this having as a result, with time, to modify the behavior of the level detector constituted by electrodes 33 and 34. To remedy that drawback, the regulating unit 60, either at pre-set times or, on the contrary, at times determined by unit 60 itself, orders the opening of valve 41 to evacuate a certain quantity of water from the container, a quantity that is either pre-determined or, on the contrary, determined by unit 60. Once valve 41 is closed, regulating unit 60 orders the opening of valve 48 for the introduction of water into container 21, until the current in electrodes 33, 34, reaches its maximum value and the water level reaches its upper threshold.

The temperature probes, one of them 69 close to container 21, the inside sheath 12, inside air flow duct 1 may have, according to a simplified operation of the invention (an operation that is linked to the programs of the microprocessor of the regulating unit 60), a safety function. If the temperature is too high or if it varies too suddenly, the current in the resistance heating element is cut-off.

The opening o f valve 41 is ordered by regulating unit 60 at the time when container 21 is removed from the generator in order to be drained.

At the time when a new container is installed, the regulating unit 60 checks the conductive state of the non-use indicator fuse 38 by sending a current through connecting block 37, for example. If the fuse is electrically conductive, the regulating unit 60 sends into the fuse a current intense enough to cause it to melt, then it starts a clock and, after a length of time that is defined as the length of the container's life, it starts an alarm (not shown) that is placed, for example, inside the cockpit of the airplane. On the other hand, if it (the fuse) is not electrically conductive, this means that there was installed a container that has already been used, and the regulating unit signals this for example by an alarm installed in the cockpit.

We claim:

1. In an air conditioning system for an aircraft, said system having a humidifier including a steam generator connected by a steam supply duct to a dilution cone located inside an air flow circulation duct (4), the improvement wherein said steam generator, comprises a container (21) equipped with an opening (22) for providing an exit of the steam developed inside said container (21), the opening (22) being connected to said air flow circulation duct (4) of the humidifier, a water feeding valve (48), said container (21) having an opening (23) connected to an outlet of said feeding valve (48) for the filling said container with water, an intake of said feeding valve 48 being adapted to be connected to a water supply source, an electric resistance heating element (30) inside said container (21), said heating element being adapted to be completely immersed up to a given level in the water in said container (21), a regulating unit (60) arranged to receive signals delivered by a hygrometer (9) located in an aircraft for governing the current passing through said resistance heating element (30) as a direct function of the value of the signals delivered by the hygrometer (9), a water level detecting means (33, 34) connected to the regulating unit (60) for governing the opening of the feeding valve (48) in response to the water level in container (21), as measured by said level detecting means (33, 34), being below a lower threshold level, and for governing the closing said valve (48) in response to the water level in container (21) exceeding an upper threshold level, means removably mounting the container (21) on a support (20), the regulating unit (60) and the feed valve (48) being carried by said support (20), and means responsive to a restarting of a stopped system for causing the regulating unit (60) to govern the feed valve (48) to fill the container (21) in response to either an installation of a new container (21) on support (20) or a setting of the system into operation after a new container (21) has been installed.

2. In an air conditioning system having a humidifier including a steam generator connected by a steam supply duct to a dilution cone located inside an air flow circulation duct (4), the improvement wherein said steam generator comprises a container (21) having an opening (22) for enabling an exiting of steam developed inside said container (21), the opening (22) being connected to said air flow circulation duct (4) of the humidifier, a water feeding valve (48), said container having an opening (23) connected to an outlet of said feeding valve (48) for filling the container with water, an intake of said feeding valve (48) being adapted to be connected to a water feeding source, an electric resistance heating element (30) inside said container (21), said heating element adapted to be completely immersed up to a given level in the water contained in said container (21), a regulating unit (60) that receives the signals delivered by a hygrometer (9) for governing the current passing through said resistance heating element (30) as a direct function of the value of the signals delivered by the hygrometer, a level detecting means (33, 34) inside the container comprising two vertical electrodes (33, 34) arranged to be immersed in the water contained in the container when filled to the given water level, the regulating unit (60) supplying current to said electrodes, the regulating unit (60) measuring the current passing through said electrodes (33, 34) to detect the water level inside container (21) as a direct function of the current flow between the electrodes, an electrically driven discharge valve 41, a discharge opening (23) in container (21) connected to the input of said discharge valve (41), said valve (41) being connected to be controlled by the regulating unit (60) to perform the discharge of a certain quantity of the water contained in container (21) at times that are set by the regulating unit (60), the regulating unit (60) immediately following said discharge by ordering an opening of the feed valve (48) until the time at which the water level in container (21) exceeds the upper threshold level, the regulating unit (60) further governing the opening of the feeding valve (48) in response to the water level in container (21) as measured by said level detector means (33, 34) as being below a lower threshold level and governing the closing of said valve (48) in response to the water level in container (21) exceeding an upper threshold level, a support (20) carrying the discharge valve (41), and the regulating unit (60) including means responsive to the removal of the container from the support for opening valve (41) to empty the container at the time that the container is being removed from the support.

3. In an air conditioning system having a humidifier including a steam generator connected by a steam supply duct to a dilution cone located inside an air flow circulation duct (4), the improvement wherein said steam generator comprises a container (21) having an opening (22) for enabling an exiting of steam developed inside said container (21), the opening (22) being connected to said air flow circulation duct (4) of the humidifier, a water feeding valve (48), said container having an opening (23) connected to an outlet of said feeding valve (48) for filling the container with water, an intake of said feeding valve (48) being adapted to be connected to a water supply source, an electric resistance heating element (30) inside said container (21), said heating element being adapted to be completely immersed up to a given level in the water contained in said container (21), the electric resistance heating element (30) being formed of a metal resistance wire that is wound into a conical spiral form over a truncated cone, the axis of the conical spiral being approximately vertical and parallel with a longitudinal axis of the container (21), the small end of said conical spiral being turned toward the bottom of the container, a regulating unit (60) including means for receiving the signals delivered by a hygrometer (9) and governing the current passing through said resistance heating element wire (30) in accordance with the value of signals received from the hygrometer, a water level detecting means (33, 34) in said container, the regulating unit (60) further governing the opening of the feeding valve (48) in response to the water level in container (21), as measured by said level detecting means (33, 34), being below a lower threshold level, and governing the closing of said valve (48) in response to the water level in container (21) exceeding an upper threshold level, and a support (50) which is movable in translation along a main axis of the container (21) and a tubular part (49) connected to the duct (4) of the humidifier, and which is connected in a movable manner onto the exit opening (22) for the steam from container (21), and connecting terminal blocks (28, 29) on the container (21) which are detachably connected the terminals of the electric resistance heating element (30) on the container, said tubular part (49) and terminal blocks (28, 29) being carried by said support (50) for movement therewith relative to the container (21).

4. In an air conditioning system having a humidifier including a steam generator connected by a steam supply duct to a dilution cone located inside an air flow circulation duct (4), the improvement wherein said steam generator comprises a container (21) equipped with an opening (22) for enabling an exiting of steam developed inside said container (21), the opening (22) being connected to said air flow circulation duct (4) of the humidifier, a water feeding valve (48), said container having an opening (23) connected to an outlet of said feeding valve (48) for filling the container with water, an intake of said feeding valve (48) being adapted to be connected to a water supply source, an electric resistance heating element (30) inside said container (21), said heating element being adapted to be completely immersed up to a given level in the water contained in said container (21), the electric resistance heating element (30) being formed of a metal resistance wire that is wound into a conical spiral form over a truncated cone, the axis of the conical spiral being approximately vertical and parallel with a longitudinal axis of the container (21) the small end of said conical spiral being turned toward the bottom of the container, a regulating unit (60) including means for receiving the signals delivered by a hygrometer (9) and governing the current passing through said resistance heating element wire (30) in accordance with the value of signals received from the hygrometer, a water level detecting means (33, 34) in said container the regulating unit (60) further governing the opening of the feeding valve (48) in response to the water level in container (21), as measured by said level detecting means (33, 34), being below a lower threshold level, and governing the closing of said valve (48) in response to the water level in container (21) exceeding an upper threshold level, the container (21) being equipped with a connecting terminal block (37) connected to the regulating unit (60) and a fuse (38) inside container (21), said fuse being connected to a terminal of resistance heating element (30), the regulating unit (60) including means for verifying, at the time of installation of a new container (21) whether the fuse (38) is conductive or not and, if it is conductive sending into it a current which is intense enough to cause it to melt and, if it is not conductive, preventing an application of a voltage to resistance heating element (30).

* * * * *